United States Patent [19]

Geary et al.

[11] 4,020,327
[45] Apr. 26, 1977

[54] APPARATUS FOR READING OPTICAL CODES

[75] Inventors: John Michael Geary, Laurence Harbor; Hans George Mattes, Ocean Township, Monmouth County, both of N.J.

[73] Assignee: Bell Telephone Laboratories, Incorporated, Murray Hill, N.J.

[22] Filed: Jan. 30, 1976

[21] Appl. No.: 653,753

[52] U.S. Cl. .................... 235/61.11 E; 250/567; 340/146.3 F
[51] Int. Cl.² ................. G06K 7/10; G06K 9/00; G06K 9/04
[58] Field of Search .............. 235/61.11 E; 340/146.3 F, 146.3 L; 250/566, 567

[56] References Cited
UNITED STATES PATENTS

| | | | |
|---|---|---|---|
| 3,457,424 | 7/1969 | Jordan et al. | 250/227 |
| 3,627,991 | 12/1971 | Beall et al. | 235/61.11 E |
| 3,706,874 | 12/1972 | Lockard | 235/61.11 E |
| 3,786,238 | 1/1974 | Heisner | 235/61.11 E |

*Primary Examiner*—Daryl W. Cook
*Attorney, Agent, or Firm*—Barry H. Freedman

[57] ABSTRACT

A reader for optically encoded information such as a credit card having an embossed data track includes an array of radiant energy transmitting elements and a single detector element formed on a planar chip. The chip is seated in a recessed area formed in a unitary lens assembly which includes a first integral lens array for focusing energy from each of the transmitting elements at particular points on the credit card, and a second integral lens array for focusing energy reflected from each of the points on the card onto the detector. Circuitry is provided to sequentially energize the transmitting elements, so that the focusing points, which preferably form a line transverse to the data track, are scanned. Signals from the detector element are processed by establishing a continuously variable threshold level derived as a function of the peak amount of reflected energy and by comparing the detector element output with the thresold value at several time intervals within the scanning period. The entire data track is read by repeating the scanning cycle as the credit card or other record medium is moved relative to the lens assembly.

15 Claims, 18 Drawing Figures

APPARATUS FOR READING OPTICAL CODES

BACKGROUND OF THE INVENTION

1. Field of the Invention

This invention relates generally to readers for optically encoded data, and, more particularly, to a system for recognizing information carried in the form of raised surface areas on an information carrying member, such as an embossed credit card.

2. Description of the Prior Art

Numerous systems have been devised for detecting and interpreting data optically encoded on a record medium. For example, it is now quite common to have the bar code affixed to an article of merchandise read at a checkout counter simply by passing an optical wand over the code area, and processing the output data in an associated computer. Such decoding is simplified by the fact that the bar code is essentially one dimensional, i.e., the information is extracted by scanning a single line or track along which the data is formed.

Where embossed or raised characters are to be optically decoded, a second dimension is added, since the various characters, numerals, for example, must be scanned both along the length of the data track as well as in the width direction transverse to the track. Accordingly, a plurality of detectors are typically positioned transverse to the track, with such detectors operating in parallel as the reader is passed over the record medium. Since the areas to be scanned are closely spaced, radiant or light energy from one or more sources or emitters may be directed to the record medium via light pipes or fiber optics. Similarly, light or radiant energy reflected by the characters on the record medium can be directed to an array of detector elements by additional light transmitting fibers. Examples of such readers are contained in U.S. Pat. Nos. 3,786,238 to Heisner and 3,706,874 to Lockard.

While the aforementioned arrangements may operate satisfactorily in certain applications, the use of fiber optics is disadvantageous by virtue of the cost and complexity associated with the construction and precise alignment of a plurality of fiber tubes. Also, since light fibers must generally be fabricated so as to exhibit total internal reflection, whereby energy from one fiber cannot interact with energy from another, common termination in a single detector element presents difficulties in construction, and duplication of components results. Still further, light pipes are typically terminated in a smooth surface normal to the fiber; these surfaces emit and receive radiant energy over a large solid angle, rather than being focused at a small, well defined area. Hence, it becomes quite difficult to obtain the spatial resolution needed to satisfactorily distinguish between the signals generated by various portions of the characters being read.

In view of the foregoing, it is the broad object of the present invention to reduce the cost and complexity of readers for optically encoded data, particularly of the raised or embossed type. Specific objects are to avoid the need for fiber optics in a reader of the type described, to reduce to one the number of detector elements needed to scan an embossed character, and to improve the reader resolution and sensitivity by focusing radiant energy at discrete points on a line transverse to the data track and similarly focusing energy reflected from the aforesaid points on the detector.

As will be discussed in further detail hereinafter, a still further object of the present invention is to improve discrimination of signals received from the detector with a threshold circuit which is simple yet sensitive. In this way, the often complicated and cumbersome circuits of the prior art are avoided, and successful reading may be accomplished despite the fact that the embossments may have become distorted or flattened by user neglect.

SUMMARY OF THE INVENTION

The foregoing and additional objects are achieved in accordance with the principles of the instant invention by an optical reader which includes an array of radiant energy transmitting elements and a single detector element formed on a planar chip. The chip is seated in a recessed area formed in a unitary lens assembly which includes a first integral lens array for projecting or focusing, energy from each of the transmitting elements at particular points on the record medium being read, and a second integral lens array for focusing energy received or reflected from each of the points on the record medium onto the detector. The lens assembly may be fabricated from a clear plastic material by injection molding, thereby avoiding problems associated with both fiber optics and discrete lens supporting and positioning, since the lenses are integral parts of a single structure.

The reader further includes circuitry for sequentially energizing the transmitting elements, so that the focusing points, which preferably form a line transverse to the data track, are scanned. Signals generated by the single detector element are processed by novel circuitry which (1) establishes a continuously variable threshold level derived as a function of the peak amount of reflected energy, and (2) compares the detector output with the threshold value at several sampling intervals within the scanning period. The circuitry increases the discrimination between embossed and flat areas of the medium being read, and thereby permits successful reading despite dirty card areas or distortions in the embossed characters.

In accordance with yet another aspect of the invention, a novel sled-like mechanism is affixed to the lens assembly in order to assure proper alignment between the embossed data track and the lens assembly as the record medium is propelled through the reader.

BRIEF DESCRIPTION OF THE DRAWING

The above described and other features and advantages of the present invention will be more readily appreciated from the following detailed description, when read in light of the accompanying drawing in which.

DETAILED DESCRIPTION

Figure 1:
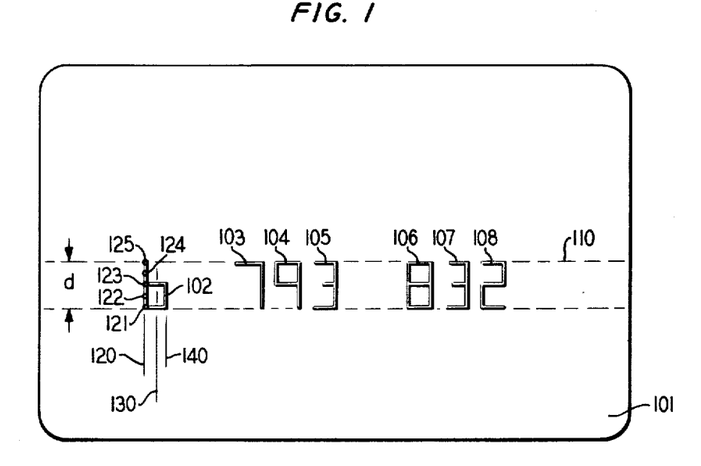
FIG. 1 is an illustration of a record carrying medium having embossed characters formed thereon.

One common form of record document in widespread use is the embossed credit card shown in FIG. 1. The card generally includes a flat laminated plastic body 101 on which raised characters 102-108 are formed. The characters may be letters, numbers or other symbols, and generally lie in a narrow rectangular area denominated data track 110. Broadly speaking, reading is accomplished by optically scanning a series of points or spots 121-125 located on a first line 120 transverse to the data track, and then moving the card so as to scan additional lines 130, 140 parallel to the first line. Each spot is scanned by focusing radiant energy thereon and detecting the amount of energy reflected therefrom. By selecting an appropriate focusing plane for the spots, the amount of energy detected when reflected from a spot at which no embossment resides is different from the amount detected when reflected from an embossed area. These differences in detected energy are then manifested in electrical signals, which may be processed to yield an indication of the character being read.

While embossments on a generally flat record medium provide one convenient means for modulating or varying the amount of reflected energy, other arrangements are also suitable for similar optical processing. Illustratively, the data track may include a series of holes or perforations formed at predetermined locations. Instead, characters, symbols or bars may be printed in a color contrasting with the background color, or indeed any other indicia may be used in which the reflectivity of selected areas on the record medium vary. It is also to be noted that the record medium need not be a flat card; the characters to be read may, for example, be disposed on the surface of a cylindrical drum, or on a flexible tape.

Figure 2:
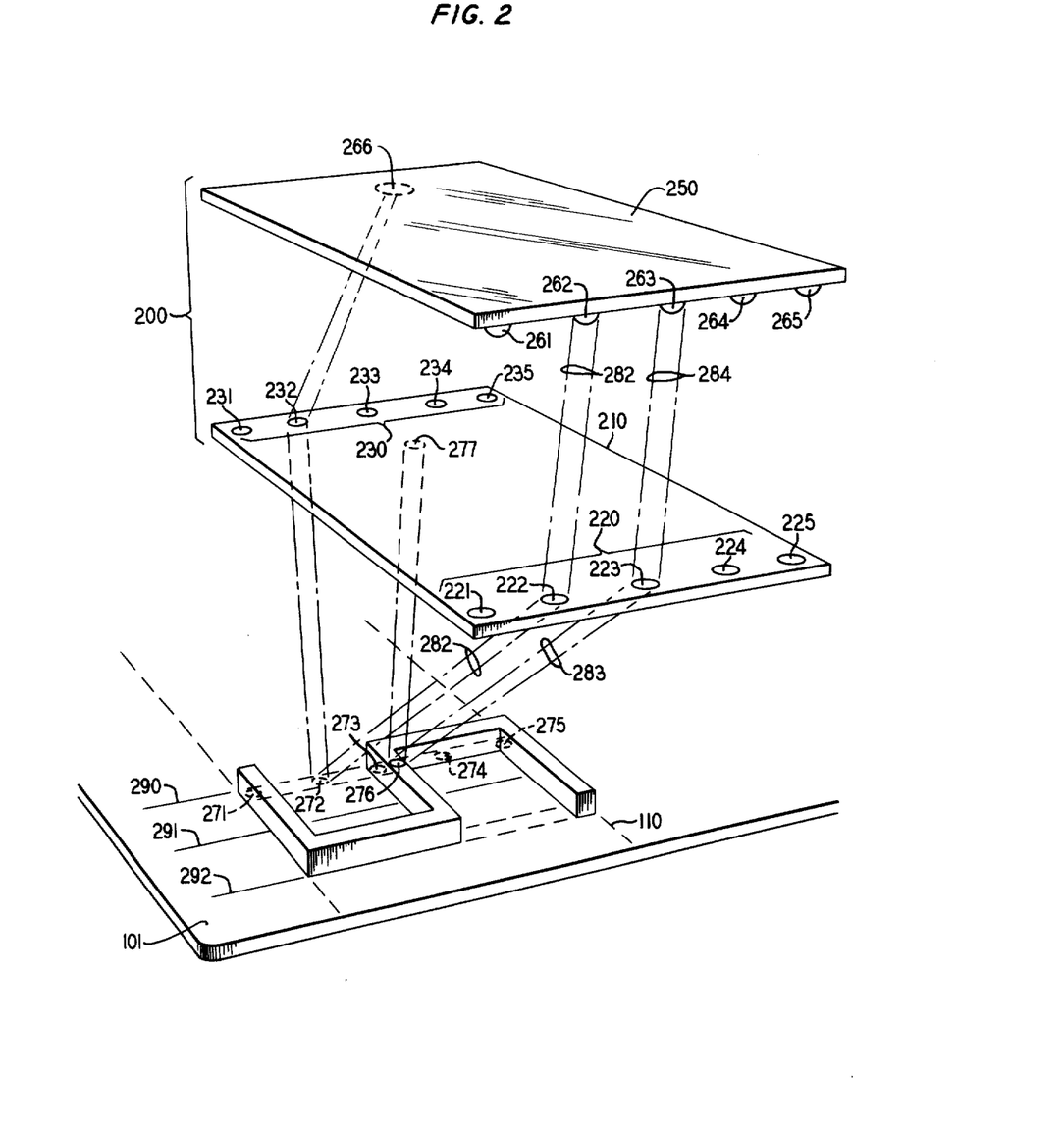
FIG. 2 is a generalized schematic representation of a reader constructed in accordance with the present invention.

The foregoing general principles may be more readily appreciated by reference to FIG. 2, in which a simplified functional illustration of an optical read head 200 constructed in accordance with the invention is shown, together with an embossed character (here, the numeral 5) to be read. Head 200 includes a planar substrate or chip 250 on which are positioned a series of radiant energy transmitting elements, such as light emitting diodes 261-265, and a single detector element sensitive to the receipt of radiant energy, such as photo field effect transistor 266. Head 200 also includes a lens assembly 210 which comprises first and second integral lens arrays 220 and 230. While the specific details of assembly 210 will be described hereinafter, for present purposes array 220 can be visualized as including a plurality of lenses 221-225, each of which is positioned a predetermined distance away from the unembossed surface of the card being read, whereby light emitted from a particular diode 261-265 is projected or focused on a particular spot on the body 101 of the credit card. Specifically, lens 221 receives light from diode 261 and projects it on spot 271 shown as a dotted circle. Similarly, lens 222 receives light from diode 262 and focuses it on spot 272, lens 223 receives light from diode 262 and focuses it on spot 273, and so forth. By appropriate arrangement of the diodes and lenses, spots 271-275 lie along a line 290 transverse to the data track on the card.

Lens array 230, similar to array 220, includes a plurality of lenses 231-235 appropriately positioned with respect to spots 271-275, so that light reflected from these spots (and only these spots) is received or "observed" by these lenses and directed to photo transistor 266. Specifically, lens 231 receives light within spot 271 and directs it to transistor 266, lens 232 receives light from spot 272 and directs it to the same detector, and so forth.

To illustrate the reader's discrimination between embossed and flat areas on the record being read, consider first a light ray, indicated for clarity by lines 282 emanating from diode 262, which is projected by lens 222 on spot 272, illuminating that spot. Since lens 232 is arranged to observe light within spot 272 and direct it to photo transistor 266, the transistor output will thus be "high" when the diode 262 is operated. By way of comparison, when diode 263 is energized, light emanating therefrom is projected by lens 223 and directed toward spot 273, which is shown dotted since it lies in the plane of the flat area of the card, beneath the embossment present thereat. The light ray, shown as lines 283, does not however reach spot 273, since it sooner strikes the embossed area at point 276, being reflected to a spot 277 on the lens array apart from the receiving array 230. Accordingly, the observed area (spot 273) of lens 233 is not illuminated, and the output of photo transistor 266 is thus "low". Similarly, light rays emanating from the remaining diodes 261, 264 and 265 are directed towards spots 271, 274, 275 at which raised areas are located. As a result, the output of transistor 266 will also be low when these diodes are energized.

Figure 3:
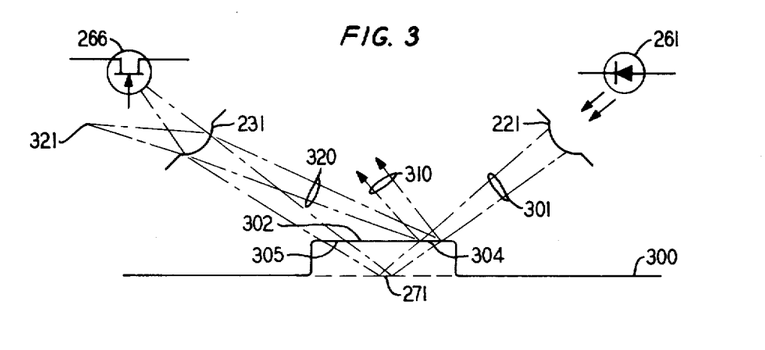
FIG. 3 is a side view showing the optical characteristics of the reader of FIG. 2.

Discrimination between embossed and flat card areas is further illustrated in FIG. 3. As shown in side view, light from diode 261 is projected by lens 221 toward spot 271 which lies in the image plane of that lens and which coincides with the plane of the flat surface of card 300, as indicated by broken lines 301. If embossment 302 were not present, the illumination of spot 271 would be observed by lens 231, which focuses received light on the photo detector 266. However, due to the presence of the embossed area 302, the specular reflected rays 310 are not directed toward lens 231. Furthermore, diffuse reflected rays 320 from region 304, even if they do strike lens 231, are not focused by that lens on detector 266, but rather are focused elsewhere, for example, at point 321. Thus, since the region illuminated 304 and the region observed 305 are different, the output of detector 266 is low.

Figure 4:
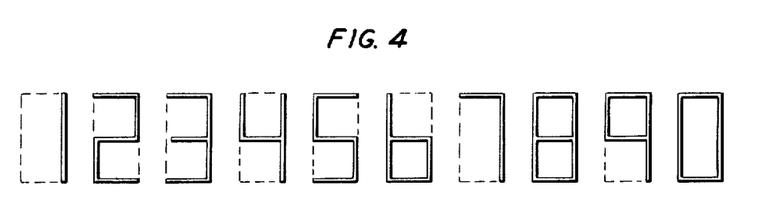
FIG. 4 is an illustration of various characters that may be read using the reader of FIG. 2.

Returning now to FIG. 2, scanning of the character 5 may proceed as follows. First, diodes 261-265 are sequentially energized, beginning with diode 261. If a high output from transistor 266 is denominated a 1 and a low output is denominated a 0, the output sequence would thus be 0-1-0-0-0. Second, at some later time, the record medium reaches a position whereby the spots 271-275 are located along line 291 which is parallel to the first scan line 290 and also transverse to track 110. When the diodes again are sequentially activated, the output sequence would be 0-1-0-1-0. Finally, at a still later time, the record medium reaches a third scan line 292, wherein the result of diode sequencing is 0-0-0-1-0. Accordingly, the results of scanning of the character 5 may be thought of as a 15 digit binary code word 01000-01010-00010. If similar scanning is performed on the characters shown in FIG. 4, i.e., beginning the first scan at the lower left hand corner of the character and ending the third scan at the upper right hand corner, the results thereof, as set forth in the following table, show that the code associated with each character is unique:

| Character | Code Word |
|---|---|
| 1 | 11111-11111-00000 |
| 2 | 00010-01010-01000 |
| 3 | 01010-01010-00000 |
| 4 | 11000-11011-00000 |
| 5 | 01000-01010-00010 |
| 6 | 00000-01010-00010 |
| 7 | 11110-11110-00000 |
| 8 | 00000-01010-00000 |
| 9 | 11000-11010-00000 |
| 0 | 00000-01110-00000 |

The actual logic circuitry needed to distinguish between the unique code words listed above is conventional, and need not be further described here. However, it is to be understood that scanning of five spots is illustrative only and other arrangements may perform equally as well. Similarly, three scan lines need not always be used; in actual operation, each character may be scanned a great number of times, with only the results of selected scans being further processed and the remainder discarded.

Figure 5:
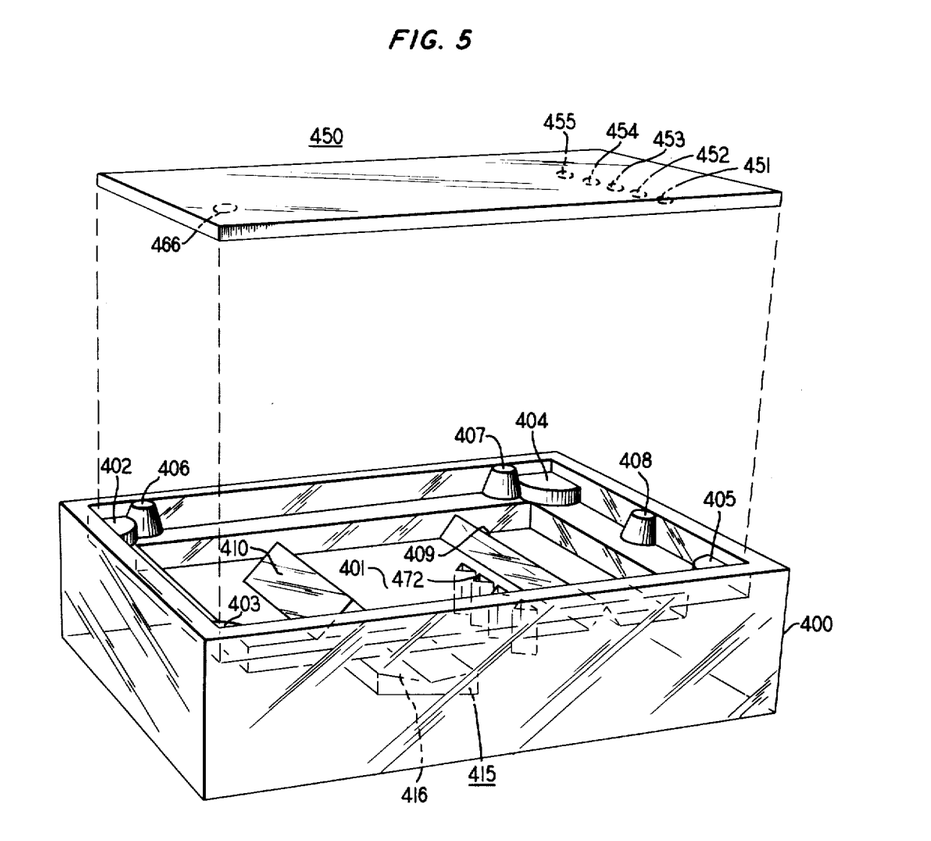
FIG. 5 is a perspective view of the lens assembly of the present invention, and also includes the chip containing the transmitting and detector elements.

The general operating technique described above may be successfully practiced only if reading head 200 is properly positioned with respect to the record being read and lens assembly so that light from one diodes does not illuminate a spot associated with other diodes. To this end, various detailed views of a lens assembly constructed in accordance with the invention are shown in FIGS. 5-8, in which like elements retain the same designations. A substrate 450 containing an array of light emitting diodes and a photo detector is also shown in FIG. 5 in an expanded view, and in FIG. 7 as assembled.

Figure 6:
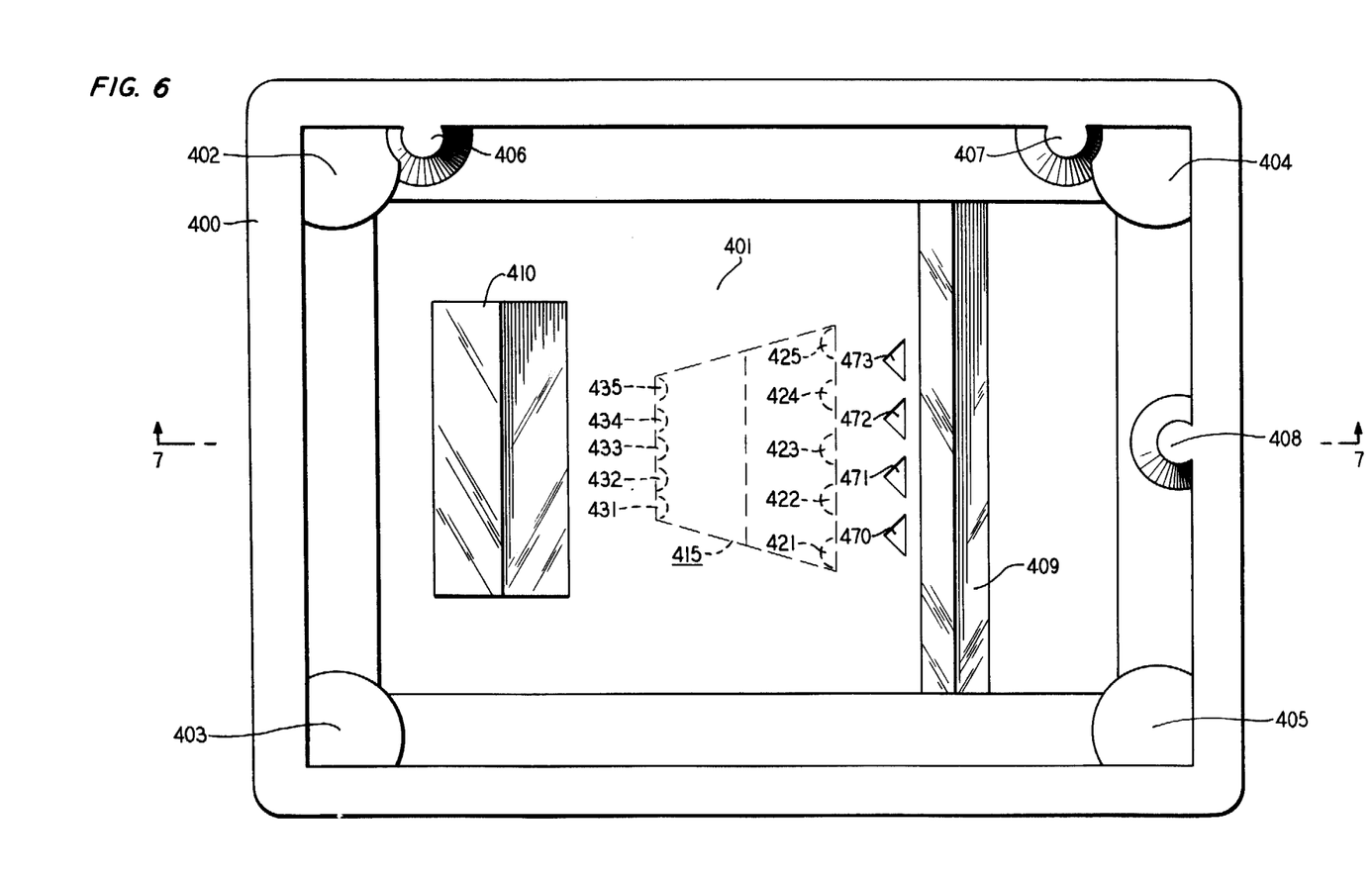
FIGS. 6, 7 and 8 are top and side views, and a bottom detail, respectively, of the lens assembly of FIG. 5.

Lens assembly 400 is fabricated from a block of a substance, plastic, for example, that is transparent to light of the frequency emitted by the light emitting diodes or other radiant energy transmitting elements. Formed in the top surface of the assembly is a sunken or recessed area designated generally at 401, which is designed to receive planar substrate assembly 450 therein. Vertical alignment of the substrate 450 is assured by locating four shelf-like elements with horizontal platforms 402-405 in the corners of area 401. Horizontal substrate alignment is provided by three frusto-conical elements 406-408 also located within the perimeter walls of area 401. In manufacture, as shown in FIG. 6, the substrate 450 is rested on platforms 402-405 whereupon the edges of the substrate contact and are positioned by elements 406-408. The substrate is held permanently in position by a suitable adhesive.

Substrate 450 includes an array of light emitting diodes 451-455 which produce a controlled distance from the flat undersurface of the substrate, and a detector such as photo transistor 466 which similarly is formed in a small area essentially on the same substrate surface. If desired, a portion of the electronic circuitry to be described hereinafter may be located on the substrate as well. In order to insure that light from the diodes may enter the lens assembly 400 at right angles, a first inclined entrance surface 409 is formed on the area 401 in proximity to the location of diodes 451-455. In like manner, a second inclined surface 410 is formed in proximity to transistor 466, so that observed light may exist assembly 400 at a generally normal angle.

Figure 7:
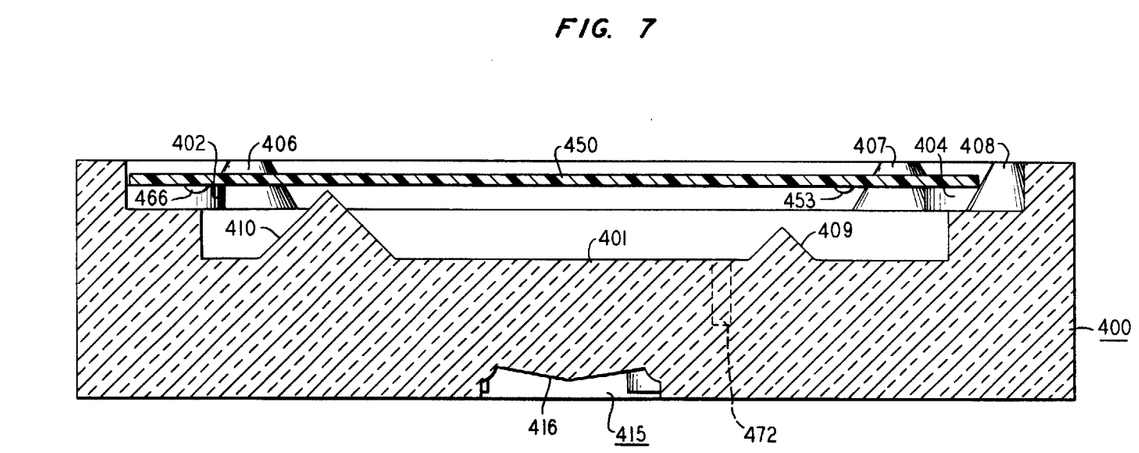
Figure 8:
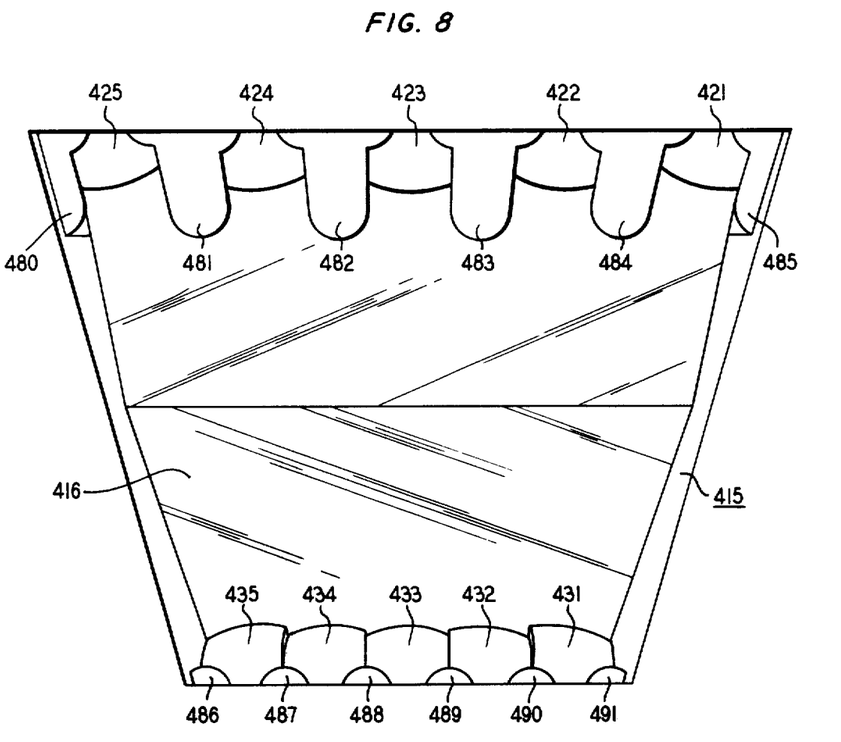
Figure 9:
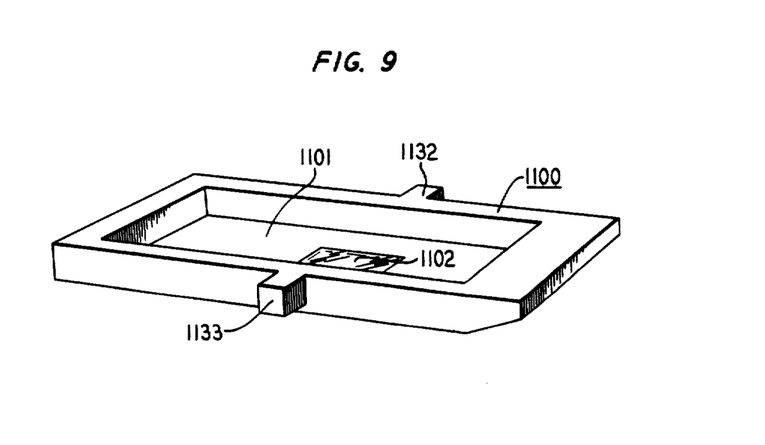
FIG. 9 is a perspective view of a head positioning mechanism for use with the lens assembly of FIGS. 5-8.
Figure 10:
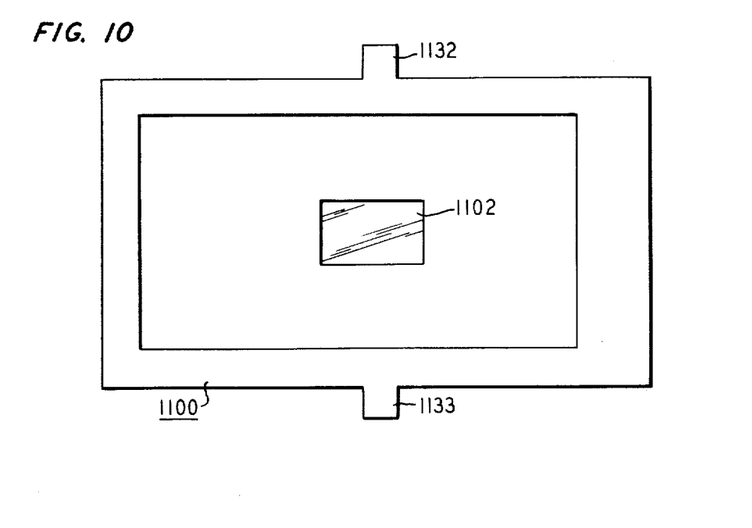
FIGS. 10, 11 and 12 are top, bottom and side views, respectively, of the mechanism of FIG. 9.
Figure 11:
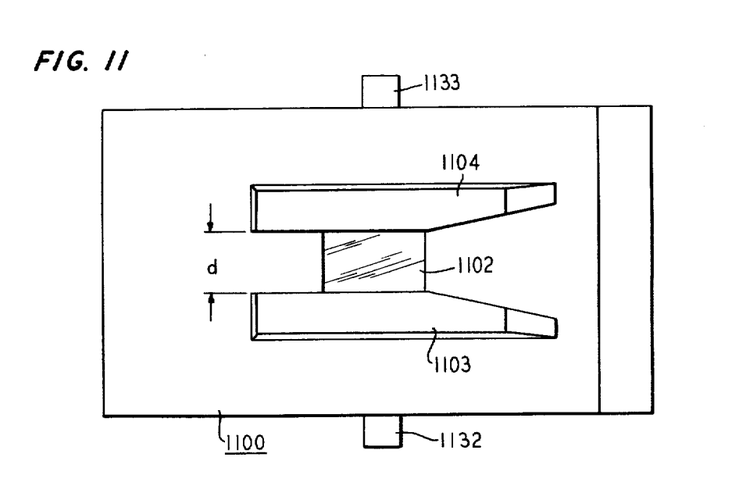
Figure 12:
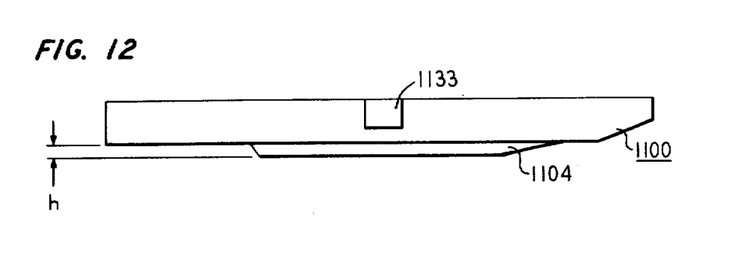

Two lens arrays are formed in assembly 400 in a recessed cavity designated generally at 415 located in the bottom surface thereof. The first array, comprising projection lenses 421-425 are formed along the longer end of cavity 415, which is generally trapizoidal in bottomview (FIG. 7). The second array comprising receiving lenses 431-435 are formed along the opposite, shorter end of cavity 415. Each of the projection lenses 421-425 consist of spherically curved convex projections or "bumps" which are integral parts of the lens assembly, and which protrude into cavity 415. Each lens 421-425 is associated with a particular diodes 451-455, respectively, by orienting the lenses so that a light ray emanating from a particular diode which passes through the center of an associated lens strikes the surface of that lens at a right angle. The curvature and positioning of each lens is such that it focuses the image of its associated diodes at a spot on a plane below the lens assembly, and that the spots fall in a line transverse to data track to be read. Similarly, each of the receiving lenses 431-435 also consist of spherically curved integral projections or bumps, each of which is associated with and "observes" a particular spot. These lenses are tilted in a fan like arrangement whereby light which is reflected from the focusing spot associated with a lens and which strikes the center of that lens, enters at a right angle and continues to transistor 466. Specifically, light reflected from the spot illuminated by diode 451 and lens 421 is focused by lens 431 or detector 466; light reflected from the spot illuminated by diode 452 and lens 422 is focused by lens 432 on detector 466, and so on.

Since the distance between the lenses in both the projecting and receiving arrays may be quite small, precautions must be taken to insure that light from a projection lens does not strike the focusing spot of a non-associated receiving lens. For this purpose, a series of deflecting baffles 470-473 may be formed in assembly 400. These baffles, which may be triangular voids extending downwardly from the floor of area 401, are offset from direct lines drawn between the diodes 451-455 and their associated projecting lens 421-425, so that transmission of properly directed light is not impeded. However, stray light from any diode which may be directed toward a non-associated projecting lens will strike the baffles, which do not pass light because the angle of incidence is too great; the deflected light is instead reflected internally within the lens assembly. Provision may be made for the eventual absorption of such internally reflected light by coating the non-operating surfaces of the assembly with a black paint which, if unpigmented, would have an index of refraction identical to that of the substance comprising the lens assembly. When the internally reflected light strikes a coated surface, it thus exits the transparent material and enters the pain without any further reflection due to the matching of indices of refraction. As the light proceeds through the paint, it is quickly absorbed by the black pigment.

To further protect against ill effects caused by stray light, an inverted inclined "roof" 416 is provided atop cavity 415 to prevent this light from illuminating the region of the focusing spots by reflecting light incident thereon in such a direction that it will miss detector 466. Still further, separators 480–491 are formed between each lens in both the projecting and receiving arrays. The separators are composed of the same transparent substance as the rest of the lens assembly and are shaped so as to block light from unintended areas by either total internal reflection or to refract the light to a region far removed from the intended area of focused illumination.

By virtue of the unitary construction of lens assembly 400, which may be fabricated using injection molding, correct positioning of the lenses with respect to each other is assured. However, it is also important that the entire reading head, of which assembly 400 is a part, be properly located with respect to the record medium being read. For this purpose, the head alignment mechanism of FIGS. 9–13 may be employed. The mechanism generally comprises a flat rectangular sled 1100 having a recessed area 1101 formed on the top surface thereof for receiving lens assembly 400 therein. A central aperture 1102 is formed in area 1101 and is aligned with cavity 415 of assembly 400 so that light from lens array 220 can pass through to the card being read and is reflected back to lens array 230. Formed on the bottom surface of sled 1100 are a pair of raised parallel runners 1103, 1104 which are spaced apart from one another to form a channel of width $d$ which corresponds to the transverse width of the characters to be read (see FIG. 1) The height $h$ of runners 1103, 1104 is made somewhat greater than the height that embossed characters are raised from the flat surface of the card being read. The leading edges of runners 1103 and 1104 are tapered both in height and in width, so that embossed characters are guided between the runners as the record medium is moved past the head.

Figure 13A:
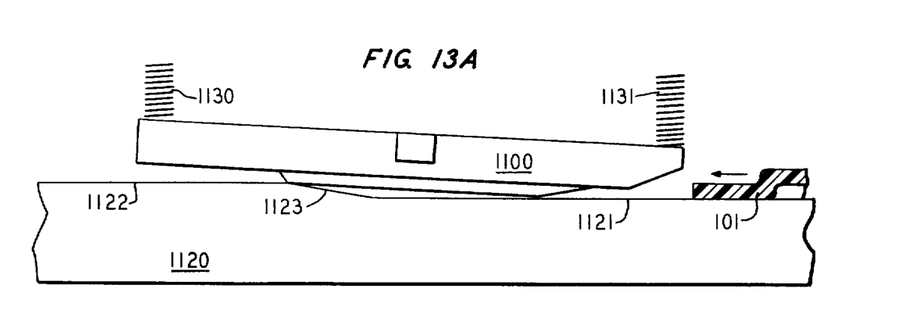
FIGS. 13A-13C are side views of the mechanism of FIG. 9 shown before insertion, during initial insertion, and during later reading of a record medium, respectively.
Figure 13B:
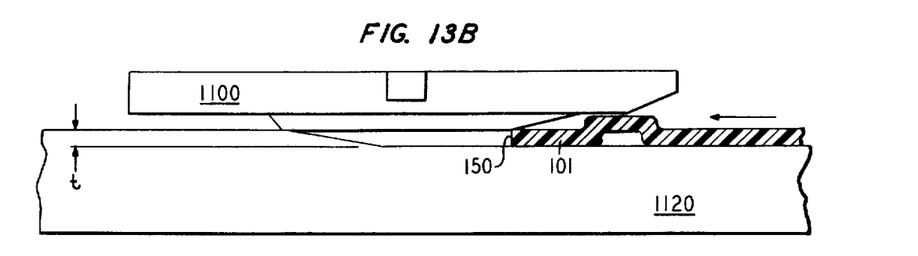
Figure 13C:
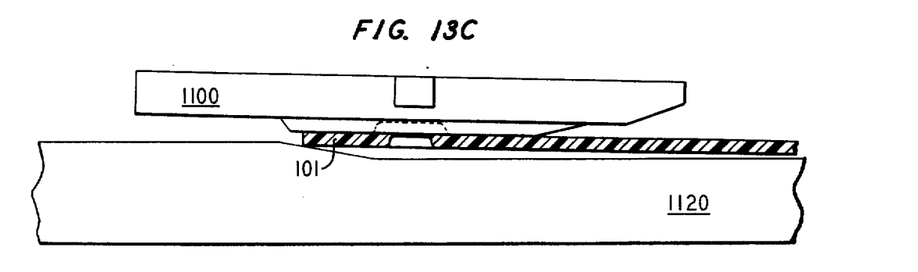

Sled 1100 is spring biased toward a guide surface 1120 (see FIG. 13) by springs 1130 and 1131. The sled is held in position by slots, not shown, which attach to tabs 1132 and 1133 so as to permit vertical movement and rotation but not longitudinal translation. Surface 1120 includes flat parallel entrance and exit portions 1121 and 1122, respectively, offset from each other by a distance $t$ which corresponds to the thickness of the record medium being read. A central ramp portion 1123 connects portions 1121 and 1122. The purpose of ramp 1123 is to assure that when the record initially contacts sled 1100, runners 1103 and 1104 will be parallel to the record surface and thus more easily confine the embossed characters to the channel between the runners. Specifically, as shown in FIG. 13A, the record 101 has not yet contacted sled 1100, which is in its slanted rest position. In FIG. 13B, the record leading edge 150 has contacted the sled, which is parallel to entrance and exit portions 1121 and 1122. Accordingly, the first embossed character is then positioned so as to easily enter the channel formed by the runners 1103 and 1104. Subsequently, when the character is positioned directly below aperture 1102, as shown in FIG. 13C, optical reading may begin.

Figure 14:
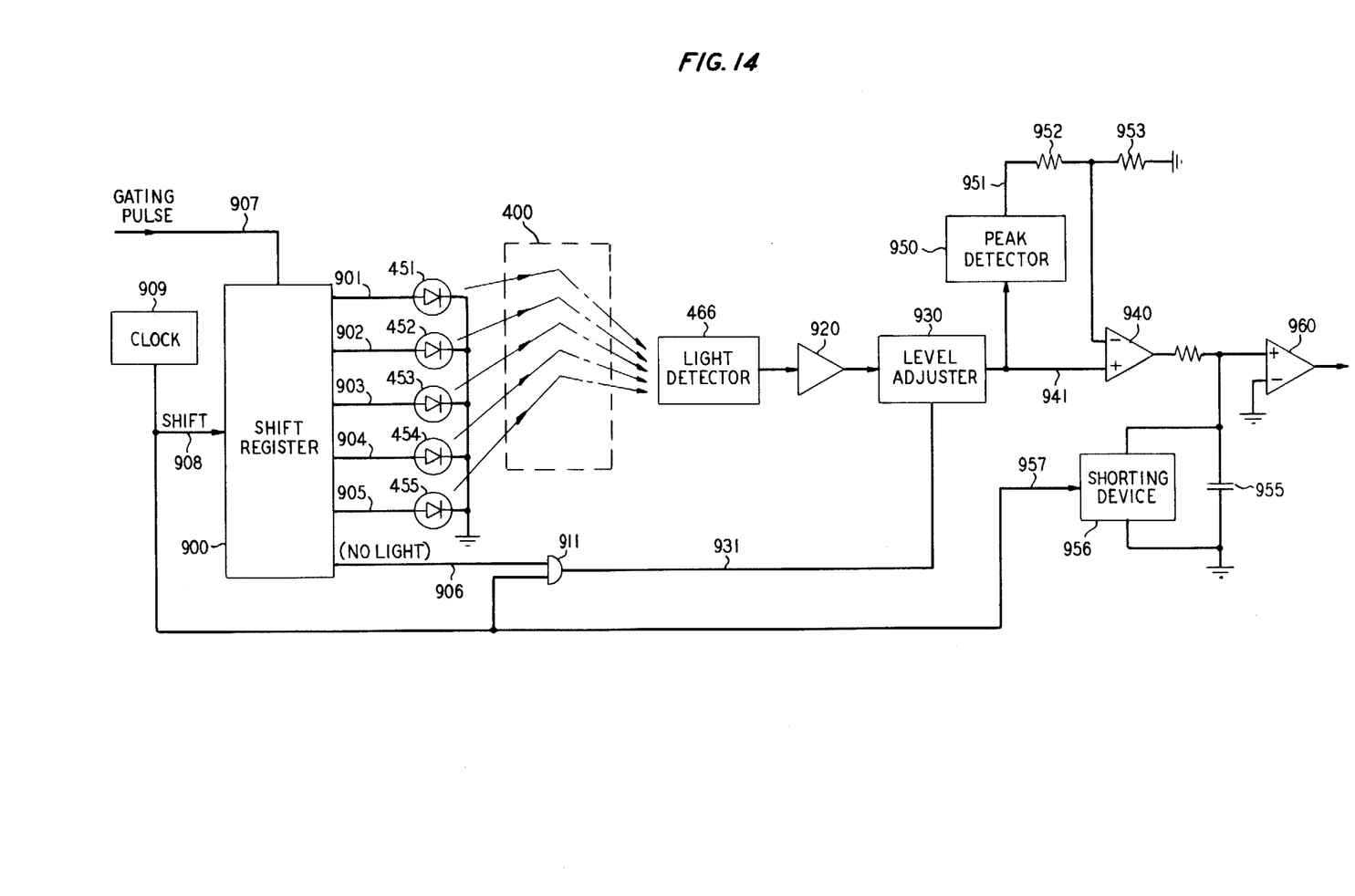
FIG. 14 is a block diagram of the processing circuitry of the present invention.
Figure 15:
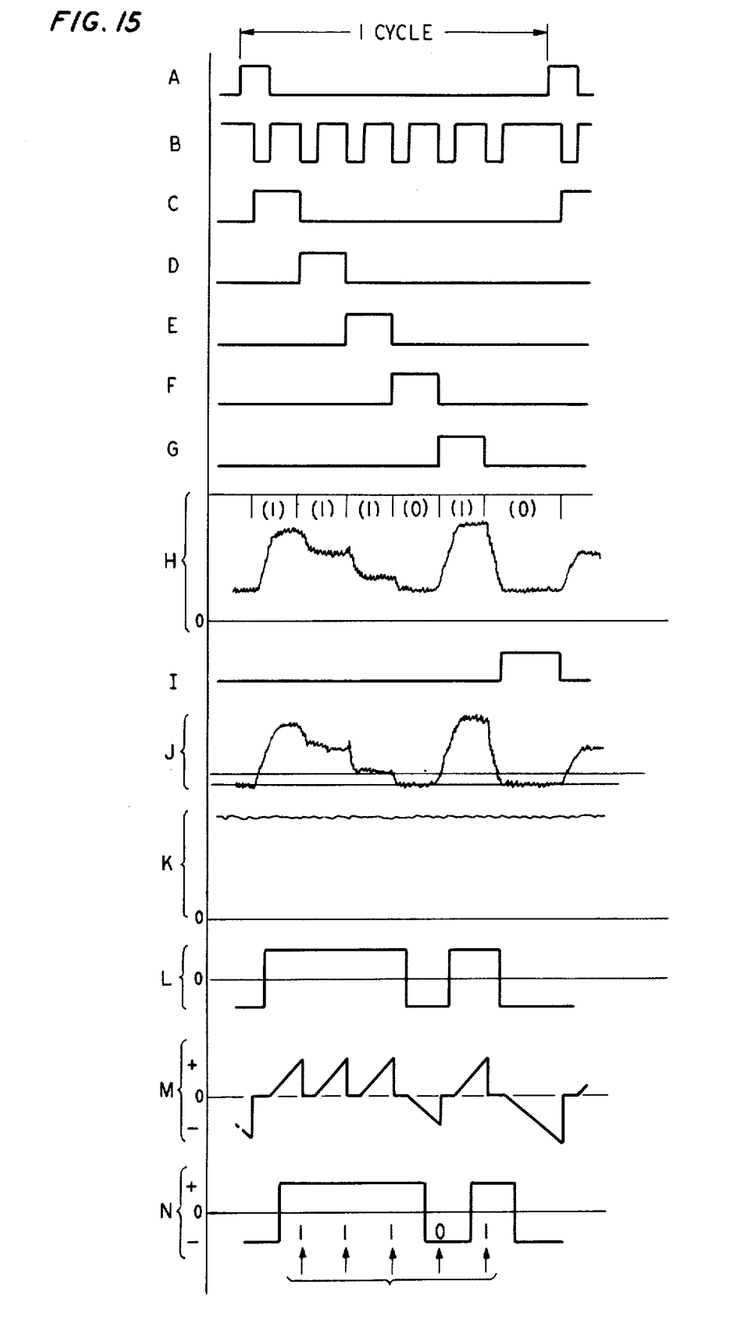
FIG. 15 consisting of 115A through 15 N depicts various waveforms present in the circuit of FIG. 14.

A block diagram of the electrical circuitry used both to sequentially energize the diodes 451–455 and to process the output signals generated by photo detector 466 of FIG. 5 is shown in FIG. 14. Waveforms present at various points in the circuitry is shown in FIG. 15.

Sequential energization of diodes 451–455 is provided by a shift register 900 having output terminals 901–906 where outputs 901–905 are connected to diodes 451–455, respectively. The shift register is initially enabled by the presence of a gating pulse on line 907 (see waveform A of FIG. 15). Subsequently, a high output sequentially appears on terminals 901–906 (see waveforms C–G) as shift pulses are supplied to register 900 on line 908 from the output of a clock circuit 909 (see waveform B of FIG. 15). The final output terminal 906 of register 900 is connected to one input of AND gate 911, the other input of which is supplied from clock 909. During the period between successive gating pulses on line 907, the character to be read is scanned once. A typical frequency for the gating signal is 5000 pulses per second. Since shift register 900 must complete a scan cycle within the gating period, the frequency of clock circuit 909 should thus be at least N times that of the gating signal frequency where N is the number of stages in register 900.

The output of photo transistor 466 (waveform H is typical) is coupled through an amplifier 920 to a level adjuster circuit 930, described in detail hereinafter, which is designed to remove from the amplified photo transistor output the DC offset or bias originating in the photo transistor. The output of AND gate 911, which is high only when no diode is energized, (waveform I) is used to activate the level adjuster 930 via line 931.

The output of level adjuster 930 (waveform J) is coupled to one input of a comparator circuit 940 via line 941 and to the input of a peak detector 950. The detector is designed to produce on output line 951 a signal shown in waveform K of FIG. 15, which is equivalent to the maximum or peak input applied thereto during the recent past. This signal gradually decays unless refreshed by new input signals of high value. The output of peak detector 950 is applied to a voltage divider, which may simply comprise two resistors 952 and 953. The signal appearing at the resistor junction, which is proportional to the peak signal, is used as a continuously variable threshold for comparator 940 and is applied to the other input terminal thereof. It has been found that a resistance ratio of 9:1 for resistors 952 and 953, respectively, is well suited for generating for threshold level and that discrimination between flat end embossed areas is achieved even despite dirt on the card surface or minor deformation due to mishandling. As the diodes 451–455 are sequentially energized, the output of comparator 940 will be high during periods when the signal on line 941 is greaterthan the threshold, and low when the signal on line 941 is lower than the threshold, as shown in waveform L of FIG. 15. As explained previously, a high output is indicative of a flat area being scanned, while a low output corresponds to an embossed area.

Despite the thresholding described above, the output of comparator 940 may switch between its high and low states during a given clock period due to the presence of electrical noise. Accordingly, it is desirable to filter the output by its application to an integrating capacitor 955. During the integration, a high output of comparator 940 causes upward integration, while a low comparator output causes downward integration, as shown in waveform M of FIG. 15. The capacitor voltage is set to zero between each gating period by activating a shorting device 956 connected across capacitor 955 via clock pulses on line 957.

Final processing is performed in a second comparator with hysteresis 960, which receives the output from capacitor 955 and converts it to a bilevel output shown in waveform N of FIG. 15. The term hysteresis in this connection means that the comparator's threshold is high for upgoing signals and low for downgoing signals, or, in other words, that the input signal must undergo a substantial change before it can alter the stage of the output signal. This output signal is sampled N times during each scan by character recognition circuitry, which is stated previously, forms no part of the present invention.

Figure 16:
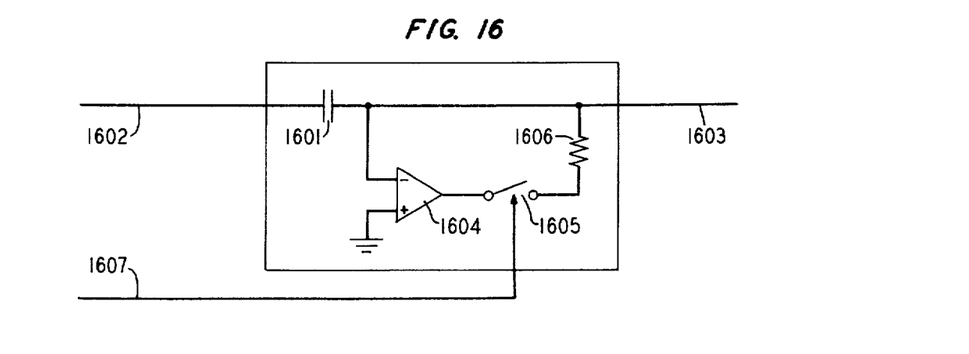
FIG. 16 is a schematic diagram of the level adjuster circuit of FIG. 14.

For the sake of completeness, the details of the level adjuster circuit 930 of FIG. 14 are shown in FIG. 16. The circuit includes a capacitor 1601 serially interposed between the input and output terminals, 1602, 1603, respectively, an operational amplifier 1604 connected to the output terminal and to ground potential, and a switch 1605 connecting the amplifier output to terminal 1603 via resistor 1606. Amplifier 1604 is arranged to provide at its output a voltage of polarity opposite to that applied from the output of capacitor 1601. Switch 1605 is closed during a zeroing period when the signal on line 1607 is high. Operation is as follows: when a positive DC potential is present at terminal 1603 and switch 1605 is closed, a negative voltage appears at the output of amplifier 1604 causing a reduction in capacitor voltage by current flow from the capacitor through resistor 1606 to the amplifier. Stabilization thereafter occurs when both inputs to amplifier 1604 are at the same (ground) potential; the net negative voltage on capacitor 1601 is thereafter stored when switch 1605 is opened, removing the positive bias which previously existed. If, on the other hand, a negative DC potential exists at terminal 1603, the operating sequence is reversed. Specifically, in that case, the output of amplifier 1604 goes high, increasing the capacitor voltage until the sum of the capacitor voltage and the input voltage is zero. Again, the positive voltage is subsequently held on capacitor 1601 after switch 1605 is opened, removing the negative bias which previously existed.

Various modifications and adaptations of the present invention will be readily apparent to those skilled in the art. Accordingly, it is intended that the invention be limited only by the following claims.

What is claimed is:

1. Apparatus for scanning data optically encoded along a track on a record medium, comprising:
    a first planar assembly including a linear array of radiant energy transmitting elements and a single detector element;
    a lens assembly including (a) a first integral array of lenses each for focusing energy from an associated one of said elements on a particular point on said medium, each of said points forming a line transverse to said track, and (b) a second integral array of lenses each for focusing energy reflected from an associated one of said points on said detection element; and
    means for sequentially energizing said transmitting elements to scan said encoded data along said line.

2. The invention defined in claim 1 wherein said lens assembly includes a block of transparent material having a top surface, a first recess formed in said top surface for receiving said planar assembly, a bottom surface, and a second recess formed in said bottom surface,
    and wherein said first and second arrays includes a plurality of spherically curved convex projections formed along opposite sides of said second recess.

3. The invention defined in claim 2 wherein said lens assembly includes a plurality of radiant energy deflecting baffles offset in position from direct lines drawn between said lenses of said first array and said associated transmitting elements.

4. The invention defined in claim 3 wherein said second recess includes an inverted inclined roof adapted to deflect energy incident thereon away from said detector element.

5. The invention defined in claim 4 wherein said lens assembly further includes at least three frusto-conical elements positioned on the perimeter of said first recess for horizontally aligning said planar assembly within said first recess.

6. The invention defined in claim 5 wherein said lens assembly further includes a first inclined surface formed within said first recess in proximity to said transmitting elements for enabling energy from said elements to enter said assembly at a right angle, and a second inclined surface formed within said first recess in proximity to said detector element for enabling energy focused by said second lens array to exit said assembly at a right angle.

7. The invention defined in claim 6 wherein said radiant energy transmitting elements comprise light emitting diodes and said detector element comprises a photo-sensitive transistor.

8. Apparatus for optically reading embossed characters on a record medium, comprising
    a plurality of light transmitters,
    a lens assembly including a first plurality of lenses each associated with a particular one of said transmitters, each of said lenses being arranged to focus light from an associated transmitter on a different spot on said record medium where an embossment may be present,
    a light sensitive detector having an output,
    a second plurality of lenses integrally formed in said lens assembly, each of said lenses being arranged to receive light reflected from an associated one of said different spots,
    means for sequentially energizing said light transmitters to scan said different spots, and
    circuit means for receiving said output of said detector and for providing a sequential indication of the presence or absence of an embossment at said different spots.

9. The invention defined in claim 8 wherein said lens assembly further includes a plurality of baffles arranged to prevent light from said transmitters from reaching a non-associated one of said first plurality of lenses.

10. The invention defined in claim 8 wherein said circuit means includes
    first means responsive to said detector output for generating a threshold signal proportional to the peak value of said output during the recent past, and
    second means jointly responsive to said detector output and said threshold signal for producing a binary output signal having a first state when said detector output is greater than said threshold signal and a second state when said threshold signal is greater than said detector output.

11. The invention defined in claim 10 wherein said circuit means further includes third means responsive to said energizing means for providing a zeroing signal when said light transmitters are deenergized, and fourth means for removing D.C. bias from said detector output in response to said zeroing signal.

12. The invention defined in claim 8 wherein said apparatus further includes means for aligning said lens assembly with said record medium, said aligning comprising:

a sled having top and bottom surfaces, a recess formed in said top surface for receiving said lens assembly therein, a pair of parallel runners formed on said bottom surface, said runners forming a channel for guiding said characters therebetween, and an aperture formed in said sled between said channel and said recess in said top surface for permitting light focused by said first plurality of lenses to reach said characters and for permitting light reflected from said characters to be focused on said detector by said second plurality of lenses.

13. An optical reader for embossed record medium, including at least first and second light sources, a light detector, a lens assembly including (a) at least first and second transmitting lenses for focusing light from said first and second sources, respectively, on first and second spots on said medium, and (b) at least first and second collecting lenses for focusing light reflected from said first and second spots, respectively, on said detector, means for energizing said first and second sources during first and second portions of an operating cycle, respectively, and means responsive to the output of said detector during said first and second portions of said cycle for determining the presence of an embossment in said first and second spots, respectively.

14. The invention defined in claim 13 wherein said lens assembly includes a block of transparent material having top and bottom surfaces, said light sources are disposed adjacent said top surface, said bottom surface includes a recessed area, said transmitting lenses include spherically curved convex projections formed along one side of said area, and said collecting lenses include spherically curved convex projections formed along the opposite side of said area.

15. The invention defined in claim 14 wherein said presence determining means includes first circuit means for establishing a variable threshold signal proportional to the peak value attained by said detector output, and second circuit means jointly responsive to said threshold signal and said detector output for generating a binary output signal having a first level when said output exceeds said threshold and a second level when said output does not exceed said threshold.

* * * * *